Figure 1:
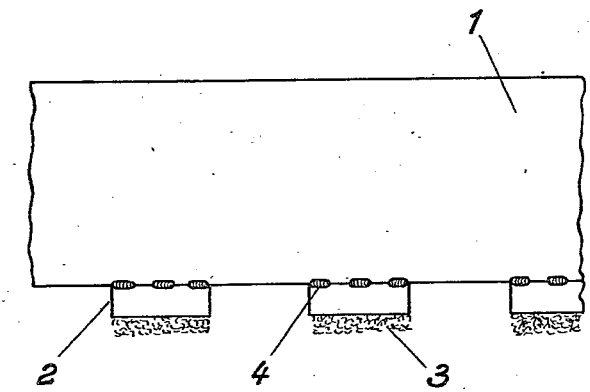

July 9, 1957 C. BALLHAUSEN 2,798,474
HARD-METAL CONTAINING MIXTURES AND PROCESSES OF APPLYING THEM
TO SUPPORTING BODIES AND SUPPORTING BODIES SO TREATED
Filed Sept. 15, 1952

Inventor:
Carl Ballhausen
By Cushman, Darby & Cushman

2,798,474

HARD-METAL CONTAINING MIXTURES AND PROCESSES OF APPLYING THEM TO SUPPORTING BODIES AND SUPPORTING BODIES SO TREATED

Carl Ballhausen, Krefeld, Germany, assignor to Deutsche Edelstahlwerke Aktiengesellschaft, Krefeld, Germany Application September 15, 1952, Serial No. 309,733

Claims priority, application Germany September 18, 1951

12 Claims. (Cl. 125—18)

The present invention relates to hard-metal-containing mixtures and processes of applying them to supporting bodies and bodies so treated.

By hard metals when referred to herein and in the claims hereof are to be understood hard substances comprising hard carbides as of the metals tungsten, molybdenum, vanadium, titanium, tantalum and columbium, and a low melting auxiliary metal such as iron, nickel or cobalt. The hard carbides may be present singly or severally, as may be the so-called auxiliary metals. The auxiliary metal phase may also contain additional substances such as borides, silicides or the like. As is known, the constituents of hard metals as defined may be fused or sintered together (generally sintered together) and the bodies produced thereof may be used as cutting plates or the like for tools. Moreover, articles or bodies may be armoured with these hard metals in any case in which wear stresses are to be resisted. One method of using such hard metals consists in fusing them, in powder granular or other discrete form, on to a carrier, for example, a carrier of steel, with the aid of a soldering or welding medium.

The invention relates to a fusible powder mixture which is suitable for securing such a hard metal in the form described on to a support. The powder mixture must have the properties, on the one hand, of satisfactorily retaining the hard metal on the supporting body and, on the other hand, of not itself, after application, wearing prematurely and releasing the granular or powdered hard metal. These properties are possessed to an outstanding degree by a powder consisting of 5–30% chromium boride, the remainder iron, nickel or cobalt which may be present singly or severally. This power has admixed with it sintered or fused hard metal of any desired conventional composition in powder and/or granular form. That part of the total mixture which consists of the powdered mixture of chromium boride and one or more of the said metals of the iron group has the property of fusing at lower temperatures than the hard metal part, and according to the selected composition, at temperatures which are between 1000 and 1300°. Therefore, if the complete mixture is heated to these temperatures, the part consisting of chromium boride and iron metal fuses, while the hard metal, owing to its much higher fusion point, does not. The granules or powder particles of the hard metal are therefore included in the melt while retaining their shape. After solidification of the melt, a firm bond with the supporting body, more especially one of steel, is produced, so that an armoured surface is obtained which consists of hard parts embedded in a softer basic mass, it nevertheless being possible for this mass to have appreciable resistance to wear.

The size of the hard metal particles may be chosen as desired and they may be sharp-edged or rounded according to the purpose they are to serve. In this manner, it is possible to manufacture surfaces which are highly resistant to wear, which have large gripping capacity, which will have a chip-removing action, abrasive action, and the like. Thus it is possible, for example, to use coated surfaces of this nature as the working surfaces of file-like tools, grinding wheels and similar tools, the granulation of the hard metal being selected according to the working process which is to be carried out with the tool, for example, particularly fine-grained powder for finishing operations or for fine-grinding wheels. More sharp-edged coarser powder may be used for coarser work or for working on artificial or natural stone. A particularly important use is the armouring of blades of stone-sawing saws. The mixture can also be used for armouring the non-slip parts of horse-shoes and caterpillar tracks of vehicles, for tyring vehicles of all kinds, and for brake linings.

In the preparation of so-called drilling bits used in mines and quarries and in oil wells comparatively coarse grained hard metals are generally welded or fused on to the body of the tool. The powder mixture according to the invention is particularly suitable for retaining the hard metal on the tool body of such tools.

The mixture according to the invention may be applied to the support, more especially to the steel support, by a powder spray gun by which, provided the hard metal is not of too coarse a grain, the powder mixture can be applied in a very simple manner. The mixture can also be extruded with a plasticising agent, such as a natural or artificial resin, into wires which are capable of being sprayed in a conventional wire-spraying gun. In order to ensure that the sprayed material adheres reliably to the base, it is advisable to bring the supporting member to elevated temperature, e. g., by bringing the workpiece to the required temperature before spraying and keeping it at this temperature during spraying, or by spraying on a cold or comparatively cold workpiece and subsequently heating the workpiece. The temperature in this case should correspond approximately to the melting temperature of the low-melting constituent of the total powder mixture.

The heating of the supporting body can be carried out in any desired manner; it is however particularly advantageous to heat it by induction heating, when it is possible to bring only the surface of a workpiece to the required temperature. This has the advantage that heat stresses in the finished workpiece are obviated or very greatly reduced.

A further way of applying the mixture to the surface of the supporting workpiece consists in stirring it with organic and/or inorganic agents into a paste which can be painted or spread onto the body of the workpiece. After the paste has been applied on the surface, it is heated to the melting temperature of the low melting constituent and fusion effected. In this case also, it is desirable to use induction heating, by means of which it is even possible thereby to bring only the low melting constituent of the paste into the fused condition without the supporting body being appreciably heated.

The process according to the invention, using the aforesaid mixture, is particularly suitable for use in the manufacture of circular saw blades or reciprocating saw blades for operating on stone.

It is known to provide saw blades with hard metal but the teeth have been previously made of hard metal and secured to the saw blades. This gives rise to difficulties in manufacture and makes the saws expensive to produce. Moreover when sawing the stone, wide cutting lines are formed because the teeth-forming plates have to have an unduly large width dimension in order that they may be fixed to the blade. In addition, when working on stone, it is necessary to operate with comparatively large feeding movements in order to break off the stone in a grain size which is as coarse as possible or in the form of large fragments. Consequently, strong and rigidly mounted machines are necessary which are not available at all places and can only be obtained at considerable expense. When working with small feeding movements, the teeth are soon worn blunt on the stone and it is constantly necessary to carry out sharpening operations with considerable loss of hard metal.

These disadvantages of known saw blades for stone saws are avoided or reduced if the working surfaces of circular or reciprocating saw blades are armoured with hard cast or sintered metal reduced preferably to granular form, the hard metal being fused on to the blade by means of a powder as aforesaid consisting of from 5 to 30% chromium boride, the remainder being iron, nickel or cobalt, used singly or severally.

In this connection, it is advantageous to employ only such a quantity of the said powder as will not fill the spaces between the hard metal granules so that an aggregate of hard metal components or splinters are present between which there are large interstices or pores. Nevertheless, the body which is formed is given a high mechanical strength, so that saw blades manufactured in this manner prove equal to an outstanding degree to the stresses which occur when working on stone. The interstices and pores temporarily accommodate the stone powder which is produced and facilitate its removal from the working point.

It is particularly advantageous to provide the hard metal in coarse sharp-edged form. During use and wear, new sharp-edged fragments continually appear at the surface and sharp-edges re-appear with the breaking off of separate fragments.

It has been proposed in stone-sawing saw blade manufacture to fuse or weld-on hard metal splinters, using hard melting alloys, iron, copper and the like in order to effect fusion, but in such cases, the hard metal grain substantially disappears in the foundation mass and a wear resisting surface is formed which is not sufficiently rough and gripping to ensure efficient removal of the stone. The tendency is then towards a smooth grinding action and loss of attacking capacity. Welding of the working bodies on to the saw blade may be carried out in one operation with the formation of the bodies but in this way distortion of the blade may occur.

A saw blade according to the invention is therefore preferably so manufactured that prepared steel bodies are provided on one side edge with a layer of hard metal granules which are fused together by means of the powder, and these bodies are secured or welded to the saw blades.

Figure 1 shows by way of example a reciprocating saw blade 1 which is provided with such bodies 2, which in turn carry the coating 3 containing the hard metal fragments. The bodies are preferably welded on, and in this case a few welding points 4 are sufficient to ensure a reliable hold. The steel bodies may advantageously be slotted to engage the saw blade. During the welding operation, which is preferably carried out by means of an electric arc, the saw blade is preferably placed in water. Electric spot-welding can also be used with advantage with suitably prepared foundation steel bodies.

In the selected constructional example, the reciprocating saw blade is provided with separate bodies 2 which are spaced from one another, but they may be closer together or adjacent one another and, when small saw blades are involved, they can be provided in one piece.

This arrangement is also possible with circular saws, the individual bodies 2 assuming the shape of segments of a circle.

What I claim is:

1. A mixture of (a) hard metal consisting essentially of at least one hard carbide and an auxiliary metal in the form of a relatively low melting bonding metal selected from the group consisting of cobalt, iron and nickel, said hard metal having been reduced to powder, granular or fragmentary form and also (b) a powder consisting substantially of from 5 to 30% chromium boride and at least one of the metals selected from the group consisting of iron, nickel and cobalt, said powder as well as the hard metal being in the discrete form and said powder being fusible without fusing the discrete hard metal by heating the mixture and being capable when fused of forming a soft basic matrix for the discrete hard metal.

2. A mixture consisting essentially of hard metal which itself consists essentially of at least one carbide selected from the group consisting of tungsten, molybdenum, vanadium, titanium, tantalum and columbium carbides and an auxiliary metal in the form of a relatively low-melting point bonding metal selected from the group consisting of iron, nickel and cobalt, said hard metal being present in powder, granular or fragmentary form and being admixed with a powder consisting substantially of from 5 to 30% chromium boride and at least one of the metals selected from the group consisting of iron, nickel and cobalt, said powder as well as the hard metal being in the discrete form and said powder being fusible without fusing the discrete hard metal by heating the mixture and being capable when fused of forming a soft basic matrix for the discrete hard metal.

3. A wire element that has been extruded from a mixture consisting essentially of hard metal which itself consists essentially of at least one hard carbide selected from the group consisting of tungsten, molybdenum, vanadium, titanium, tantalum and columbium carbides and an auxiliary phase in the form of at least one low-melting bonding metal selected from the group consisting of iron, nickel and cobalt, said hard metal having been reduced to discrete form, and said mixture comprising also a powder consisting essentially of from 5 to 30% chromium boride and at least one metal selected from the group consisting of iron, nickel and cobalt, and said mixture further comprising a resinous agent which has bonded the said hard metal and said powder into a coherent form.

4. An intimate mixture consisting essentially of hard metal which itself consists essentially of at least one hard carbide selected from the group consisting of tungsten, molybdenum, vanadium, titanium, tantalum and columbium carbides and an auxiliary phase in the form of at least one low-melting bonding metal selected from the group consisiting of iron, nickel and cobalt, said hard metal having been reduced to discrete form, said mixture comprising also a powder consisting essentially of from 5 to 30% chromium boride and at least one metal selected from the group consisting of iron, nickel and cobalt and said mixture also comprising a resinous substance, said powder as well as the hard metal being in the discrete form and said powder being fusible without fusing the discrete hard metal by heating the mixture and being capable when fused of forming a soft basic matrix for the discrete hard metal.

5. A process of applying hard metal to a supporting body which comprises applying to the said body a mixture consisting essentially of hard metal which itself consists essentially of at least one hard carbide selected from the group consisting of tungsten, molybdenum, vanadium, titanium, tantalum and columbium carbides and an auxiliary phase in the form of at least one low-melting bonding metal selected from the group consisting of iron, nickel and cobalt, said hard metal having been reduced to discrete form and said mixture also comprising a powder consisting essentially of from 5 to 30% chromium boride and at least one metal selected from the group consisting of iron, nickel and cobalt; and fusing said last mentioned powder to the body so that it secures the hard components of the hard metal of the mixture to said body without fusing the hard components.

6. A process for spraying hard metal on the surface of a supporting body which comprises applying to a spray gun a coherent element consisting essentially of a mixture of hard metal itself composed essentially of distributed constituents individually composed of at least one hard carbide selected from the group consisting of tungsten, molybdenum, vanadium, titanium, tantalum and columbium carbides and an auxiliary phase in the form of at least one low-melting bonding metal selected from the group consisting of iron, nickel and cobalt and said mixture comprising also distributed particles consisting essentially of from 5 to 30% chromium boride and at least one of the metals selected from the group consisting of iron, nickel and cobalt, heating and atomising said particles containing chromium boride, depositing the atomised products onto the said surface and fusing said powder so that it secures the hard components of the hard metal of the mixture to the body without fusing the said components.

7. A process for applying hard metals to a supporting body which comprises applying to the said body a mixture consisting essentially of hard metal itself composed essentially of distributed constituents individually composed of at least one hard carbide selected from the group consisting of tungsten, molybdenum, vanadium, titanium, tantalum and columbium carbides and an auxiliary phase in the form of at least one low-melting bonding metal selected from the group consisting of iron, nickel and cobalt and said mixture also comprising distributed particles consisting essentially of from 5 to 30% chromium boride and at least one metal selected from the group consisting of iron, nickel and cobalt and, by heat imparted thereto through the supporting body, fusing the distributed particles containing chromium boride but not the hard components of the hard metal so as to secure the hard components of the hard metal to the body.

8. A process for applying hard metal to a supporting body which comprises applying to the said body a material composed essentially of distributed hard metal constituents individually composed essentially of at least one carbide selected from the group consisting of tungsten, molybdenum, vanadium, titanium, tantalum and columbium and an auxiliary phase in the form of a relatively low melting-point bonding metal selected from the group consisting of iron, nickel and cobalt, said material also comprising distributed particles consisting essentially of from 5 to 30% chromium boride and at least one metal selected from the group consisting of iron, nickel and cobalt, and said material further comprising a resinous substance, and by heat imparted through the supporting body, fusing the distributed particles containing the chromium boride but not the hard metal components so as to secure the latter to the body.

9. An article provided with a wear resisting or gripping surface consisting essentially of distributed hard metal constituents individually composed essentially of at least one carbide selected from the group consisting of tungsten, molybdenum, vanadium, titanium, tantalum and columbium and an auxiliary phase in the form of a relatively low melting-point bonding metal selected from the group consisting of iron, nickel and cobalt, which constituents are secured to the body of the article by a fused material which initially consisted of a powder containing essentially of from 5 to 30% chromium boride and at least one metal selected from the group consisting of iron, nickel and cobalt.

10. A stone-cutting saw blade formed with a cutting portion consisting essentially of distributed hard metal constituents individually composed essentially of at least one carbide selected from the group consisting of tungsten, molybdenum, vanadium, titanium, tantalum and columbium and an auxiliary phase in the form of a relatively low melting-point bonding metal selected from the group consisting of iron, nickel and cobalt, which constituents are secured to a part of the saw blade by a fused material which initially comprised a powder containing essentially from 5 to 30% chromium boride and at least one metal selected from the group consisting of iron, nickel and cobalt.

11. A stone-cutting saw blade according to claim 10 wherein the fused material does not fill the interstices between the said constituents.

12. A stone-cutting saw blade according to claim 10 wherein the fused material is also in fused relationship with separately prepared steel bodies which are in turn secured to the saw blade.

References Cited in the file of this patent
UNITED STATES PATENTS

| Number | Name | Date |
|---|---|---|
| 1,549,615 | Schroter | Aug. 11, 1925 |
| 1,551,333 | Schroter | Aug. 25, 1925 |
| 1,721,416 | Schroter | July 16, 1929 |
| 1,726,431 | Fourment | Aug. 27, 1929 |
| 1,728,909 | Schroter | Sept. 17, 1929 |
| 1,750,796 | Field | Mar. 18, 1930 |
| 1,794,229 | Hoyt | Feb. 24, 1931 |
| 1,803,875 | Stoody et al. | May 5, 1931 |
| 1,825,829 | Stoody et al. | Oct. 6, 1931 |
| 1,977,128 | Hawkins | Oct. 16, 1934 |
| 2,088,838 | Cole | Aug. 3, 1937 |
| 2,231,247 | Bleakley | Feb. 11, 1941 |
| 2,261,228 | Cockrum | Nov. 4, 1941 |
| 2,382,666 | Rohrig et al. | Aug. 14, 1945 |
| 2,428,823 | Wright | Oct. 14, 1947 |
| 2,476,699 | Cline | July 19, 1949 |
| 2,613,154 | Montgomery | Oct. 7, 1952 |

FOREIGN PATENTS

| Number | Country | Date |
|---|---|---|
| 15,593 | Great Britain | July 29, 1905 |
| 232,851 | Switzerland | June 30, 1944 |
| 443,145 | Italy | Dec. 10, 1948 |
| 478,016 | Great Britain | 1938 |
| 596,626 | Great Britain | Jan. 7, 1948 |
| 607,662 | Great Britain | Sept. 2, 1948 |

OTHER REFERENCES

J. Electro Chem. Soc., vol. 98, of 1951, pp. 465 and 473 inc.